3,082,238
ARYL DIALKYLSULFAMATES
Joseph E. Dunbar, Midland, Mich., assignor to The Dow Chemical Company, Midland, Mich., a corporation of Delaware
No Drawing. Filed Mar. 28, 1960, Ser. No. 17,801
3 Claims. (Cl. 260—456)

This invention is concerned with aryl dialkylsulfamates. More particularly, it is concerned with compounds having the formula $$Ar(OSO_2NR_2)_n$$

In this and succeeding formulas, Ar is phenyl, naphthyl, biphenylene, lower-alkylphenyl, chlorophenyl, chloro-(lower-alkyl)phenyl, nitrophenyl, nitro-(lower-alkyl)-phenyl, di-lower-alkylaminophenyl or di-lower-alkyl-amino-(lower-alkyl)phenyl; R is a lower alkyl radical containing from 1 to 4 carbon atoms, inclusive, and $n$ is 1 or 2.

By the expression "lower-alkyl" as herein employed is meant an alkyl radical containing from 1 to 4 carbon atoms, inclusive.

By the expression "lower alkylphenyl" as herein employed is meant a phenyl radical substituted with 1 to 2 lower alkyl radicals containing from 1 to 4 carbon atoms, inclusive. Illustrative of alkylphenyl radicals are o-, m- and p-tolyl, 2,4-, 2,6-, 2,3-, 3,4- and 4,5-xylyl, o-, m- and p-isopropylphenyl, o-, m- and p-normal-propylphenyl, o-, m- and p-tertiary-butylphenyl, o-, m- and p-secondary-butylphenyl, o-, m- and p-normal-butylphenyl, o-, m- and p-isobutylphenyl, 2,5-diisopropylphenyl, 2,6-di-normal-propylphenyl, 2-normal-butyl-5-normal-propylphenyl, 2-tertiary-butyl-5-normal-propylphenyl, 2 - tertiary-butyl-4-ethylphenyl, 4-tertiary-butyl-2-ethylphenyl, 2,5-di-tertiary-butylphenyl, 2,6-di-tertiary-butylphenyl, 2-isopropyl-5-methylphenyl, 5-isopropyl-2-methylphenyl and 4-methyl-2-tertiary-butylphenyl.

By the expression "chlorophenyl" is meant a phenyl radical substituted with one or more chlorine atoms. Inclusive of such radicals are the isomeric monochlorophenyl radicals, 2,4-, 2,5-, 3,4- and 2,6-dichlorophenyl radicals, the isomeric trichlorophenyl radicals, the isomeric trichlorophenyl radicals, the isomeric tetrachlorophenyl radicals and pentachlorophenyl.

By the expression "chloro-(lower-alkyl)phenyl" is meant phenyl radicals which contain both chloro and alkyl substituents. Inclusive of such radicals are 2-chloro-4 - tertiary-butylphenyl, 2-chloro-4-isopropylphenyl, 2-chloro-4-secondary-butylphenyl, 2-butyl-4,6-dichlorophenyl, 4 - butyl-2,6-dichlorophenyl, 2-tertiary-butyl-4,6-dichlorophenyl, 4-secondary-butyl-2,6-dichlorophenyl, 2,4-dichloro-6-propylphenyl, 4-chloro-2,5-xylyl and 4-chloro-2,6-xylyl.

By the expression "nitrophenyl" is meant a phenyl radical substituted with a nitro group such as o-, m- and p-nitrophenyl.

By the expression "nitro-(lower-alkyl)phenyl" is meant a phenyl radical substituted with both a nitro and lower-alkyl group such as 4-nitro-o-tolyl, 2-nitro-4-tertiary-butylphenyl, 4-nitro-2,6-xylyl, 3-nitro-4-propylphenyl, 5-nitro-o-tolyl, 2-nitro-p-tolyl, 3-nitro-p-tolyl, 6-nitro-2,3-xylyl and 6-nitro-2,4-xylyl.

By the expression "di-lower-alkylaminophenyl" is meant a phenyl radical substituted with a dimethylamino or diethylamino group.

By the expression "di-lower-alkylamino-(lower-alkyl)phenyl" is meant a phenyl radical substituted with both a di-lower-alkylamino group and lower-alkyl substituents. Inclusive of such radicals are 4-dimethylaminophenyl, 4-diethylaminophenyl, 2-dimethylaminophenyl, 3-diethyl- aminophenyl, 3-dimethylaminophenyl, 4-dimethylamino-2,3,5 - trimethylphenyl, 4 - dimethylamino-o-tolyl, 4-dimethylamino-2,6-xylyl, 4-dimethylamino-3,5-xylyl, 2,6-diethyl-4-dimethylaminophenyl, 3,5-diethyl - 4 - dimethylaminophenyl, 3-ethyl-5-methyl-4-diethylaminophenyl 4-dimethylamino-3-tertiary-butylphenyl and 4-diethylamino-3-tertiary-butylphenyl.

The compounds of the present invention are white or light colored solids or liquids soluble in many organic solvents such as ethanol, isopropyl alcohol, benzene, xylene, toluene, dimethyl sulfoxide and dimethylformamide. These compounds are useful for numerous pesticidal applications such as aquatic and terrestrial herbicides, and foliage fungicides.

The products of the present invention may be obtained by the reaction of an appropriate phenol having the structure $$Ar(OH)_n$$

with a dialkylsulfamoyl chloride having the structure $$R_2NSO_2Cl$$

in the presence of a basic reaction medium. The reaction may be carried out over a temperature range of from about 0° to 50° C. for a period of time varying from about 5 minutes to 48 hours. Approximately equivalent proportions of the reactants are employed although some of the product may be obtained regardless of the relative amounts of the reactants. The reaction may be carried out in aqueous media or in organic solvent media. When aqueous media is employed, the basic agent is generally sodium or potassium hydroxide. When the reaction is carried out in organic solvent media, the base is preferably a liquid amine compound which serves both as the basic agent and the reaction medium. Suitable organic base-solvents for carrying out the reaction include triethylamine, pyridine, picoline, collidine, lutidine and quinoline. After completion of the reaction, the reaction product is isolated from the reaction medium according to conventional procedures, the exact method depending upon whether the reaction is carried out in organic or aqueous medium.

In carrying out the reaction in organic solvent medium, a dialkylsulfamoyl chloride is added to approximately equivalent prooprtions of an appropriate phenol which is dissolved or suspended in an appropriate amine. The addition is carried out with stirring and the resulting mixture is heated for a period of time of from about 5 minutes to 48 hours. During the heating, a reaction takes place with the formation of the desired aryl dialkylsulfamate. The reaction mixture is then cooled and poured into ice water and excess mineral acid added thereto. As a result of such operations, the desired aryl dialkylsulfamate product generally precipitates as a solid and may be recovered by filtration. Alternatively, the solid may be extracted with a suitable organic solvent such as ether, benzene, or chloroform and the desired product recovered therefrom by evaporation of the solvent. The product may be purified by treating an organic solvent solution thereof with decolorizing charcoal and thereafter permitting the product to crystallize from the solvent. Suitable solvents include ethanol, aqueous ethanol, methanol, aqueous methanol, glacial acetic acid, aqueous acetic acid, benzene or a mixture of benzene and ligroin.

When the reaction is carried out in aqueous media, dialkylsulfamoyl chloride is added with vigorous agitation to a solution of an equivalent amount of phenol dissolved in an aqueous solution of sodium or potassium hydroxide. The agitation of the reaction mixture is continued at a temperature of from about 0° to 50° C. for a period of time of from about 5 minutes to 48 hours. A reaction takes place with the precipitation of the desired aryl dialkylsulfamate product as a water-insoluble solid. The latter may be recovered by filtration and purified as previously described. Frequently, the product separates as a water-insoluble liquid. When this is the case, the liquid is extracted with a water-immiscible solvent such as ether or benzene. The extract is dried over an inert drying agent such as anhydrous magnesium sulfate and the solvent removed from the dried solution by evaporation. The product is then purified as described previously.

The following examples illustrate the present invention but are not to be construed as limiting.

EXAMPLE 1

*2,4,5-Trichlorophenyl Dimethylsulfamate*

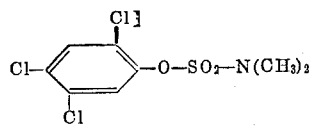

15.1 grams (0.105 mole) of dimethylsulfamoyl chloride was added in one portion to a stirred solution of 20.8 grams (0.105 mole) of 2,4,5-trichlorophenol in 50 milliliters of triethylamine at 62° C. The solution was stirred for 4 hours while allowing the mixture to gradually cool to room temperature. The mixture was then poured into an ice and concentrated hydrochloric acid mixture whereupon an oil formed which crystallized on standing. The crystalline solid was recovered by filtration, washed first with water, then with 10 percent sodium hydroxide solution to remove unreacted 2,4,5-trichlorophenol, again with water and thereafter treated with boiling aqueous ethanol and decolorizing charcoal to obtain a 2,4,5-trichlorophenyl dimethylsulfamate product. The latter was a white crystalline solid melting at 66°–67° C. and having an elemental analyses as follows:

|  | Carbon | Hydrogen | Nitrogen |
| --- | --- | --- | --- |
| Found (percent) | 31.49 | 2.70 | 4.63 |
| Theory (percent) | 31.55 | 2.65 | 4.60 |

EXAMPLE 2

*2,4,5-Trichlorophenyl Dimethylsulfamate*

14.4 grams (0.100 mole) of dimethylsulfamoyl chloride was added with vigorous stirring to a warm (45° C.) solution of 20.8 grams (0.105 mole) of 2,4,5-trichlorophenol, 24.0 grams (0.600 mole) of sodium hydroxide and 185 milliliters of water. The resulting mixture was cooled in an ice bath and the mixture stirred with cooling for one hour to obtain a 2,4,5-trichlorophenyl dimethylsulfamate product which precipitated in the reaction mixture. The product was recovered by filtration and after drying was found to melt from 65° to 67° C.

EXAMPLE 3

*Pentachlorophenyl Dimethylsulfamate*

14.7 grams (0.102 mole) of dimethylsulfamoyl chloride was added with stirring to a suspension of 26.6 grams (0.100 mole) of pentachlorophenol in 300 milliliters of triethylamine. After completion of the addition, the mixture was boiled at reflux temperature for 20 minutes with stirring and thereafter allowed to stand at room temperature for 18 hours. At the end of this period, the mixture was poured into an ice-concentrated hydrochloric acid mixture whereupon a crude pentachlorophenyl dimethylsulfamate product precipitated as a brown solid. The crude product was recovered by filtration and washed successively with water, 5 percent sodium hydroxide solution and water. Thereafter, the product was purified by decolorizing a boiling alcohol solution thereof with activated charcoal. As a result of these operations, a purified pentachlorophenyl dimethylsulfamate product melting at 150°–151° C. was obtained as white crystalline plates. The product had elemental analyses as follows:

|  | Carbon | Hydrogen | Nitrogen |
| --- | --- | --- | --- |
| Found (percent) | 26.02 | 1.50 | 3.69 |
| Theory (percent) | 25.73 | 1.62 | 3.75 |

EXAMPLE 4

*4-Tertiary-Butyl-2-Chlorophenyl Dimethylsulfamate*

A solution of 36.9 grams (0.200 mole) of 4-tertiary-butyl-2-chlorophenol and 29.3 grams (0.204 mole) of dimethylsulfamoyl chloride in 220 milliliters of triethylamine was heated on the steam bath for 45 minutes. The resulting mixture was cooled and poured into an ice and concentrated hydrochloric acid mixture whereupon a brown oil precipitated. The oil was extracted with ether and the ether extract then washed with two 125 milliliter portions of 5 percent sodium hydroxide solution and with one portion of water. The ether solution was dried over anhydrous magnesium sulfate and the dried solution placed under reduced pressure to vaporize the ether and to obtain a 4-tertiary-butyl-2-chlorophenyl dimethylsulfamate product as an amber viscous oil residue. The oily residue was dissolved in boiling ethanol and treated with decolorizing charcoal to obtain a purified 4-tertiary-butyl-2-chlorophenyl dimethylsulfamate product as white crystals melting at 36°–37° C. The product had elemental analyses as follows:

|  | Carbon | Hydrogen | Nitrogen |
| --- | --- | --- | --- |
| Found (percent) | 49.66 | 5.81 | 4.82 |
| Theory (percent) | 49.39 | 6.22 | 4.80 |

EXAMPLE 5

*4-Nitrophenyl Dimethylsulfamate*

30.1 grams (0.210 mole) of dimethylsulfamoyl chloride was added with stirring to a suspension of 27.8 grams (0.200 mole) of p-nitrophenol and 350 milliliters of pyridine at 95° C. After completion of the addition, the mixture was allowed to stand at room temperature for 24 hours, and then poured into an ice-concentrated hydrochloric acid mixture whereupon a 4-nitrophenyl dimethylsulfamate product precipitated as a light cream-colored solid. The latter was recovered by filtration and then purified with decolorizing charcoal in boiling ethanol to obtain a purified product melting at 123.5°–124.5° C. as cream-colored prisms. The product had elemental analyses as follows:

|  | Carbon | Hydrogen | Nitrogen |
| --- | --- | --- | --- |
| Found (percent) | 39.20 | 3.93 | 11.13 |
| Theory (percent) | 39.02 | 4.09 | 11.38 |

EXAMPLE 6

*3,5-Dimethyl-4-Dimethylaminophenyl Dimethylsulfamate*

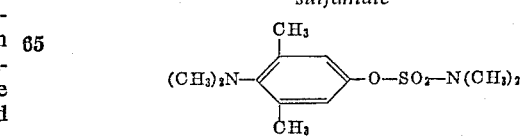

15.8 grams (0.110 mole) of dimethylsulfamoyl chloride was added with stirring to an ice cold solution of 16.5 gram (0.100 mole) of 3,5-dimethyl-4-dimethylaminophenol in 100 milliliters of 10 percent aqueous sodium hydroxide solution. The reaction mixture was stirred vigorously while cooling in an ice bath for 5½ hours at the end of which time a yellow semi-solid material precipitated in the reaction mixture. The mixture was extracted with ether and the ether extract washed with water, dried over anhydrous magnesium sulfate and the dried ether solution placed under reduced pressure to vaporize off the ether and to obtain a crude 3,5-dimethyl-4-dimethylaminophenyl dimethylsulfamate product as a light orange oil. The latter was dissolved in hot aqueous ethanol and crystallized therefrom to obtain a purified product as white crystals melting at 28°–29° C. The product had elemental analyses as follows:

|  | Carbon | Hydrogen | Nitrogen |
|---|---|---|---|
| Found (percent) | 52.95 | 7.31 | 10.04 |
| Theory (percent) | 52.91 | 7.40 | 10.29 |

EXAMPLE 7

*1-Naphthyl Dimethylsulfamate*

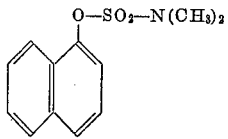

14.4 grams (0.100 mole) of dimethylsulfamoyl chloride was added with stirring to a solution of 14.4 grams (0.100 mole) of 1-naphthol in 200 milliliters of 5 percent aqueous sodium hydroxide solution. The mixture was stirred vigorously at room temperature for 17 hours whereupon a gray solid formed and precipitated in the reaction mixture. The gray solid was recovered by filtration, washed with water and dried. The filtrate above obtained was treated with about 2 grams of dimethylsulfamoyl chloride in a similar manner to that previously described to obtain additional quantities of the gray solid. The combined gray solid was decolorized by treatment with activated charcoal in boiling aqueous methanol to obtain a purified 1-naphthyl dimethylsulfamate product as white needles melting at 76°–77° C. The product had elemental analyses as follows:

|  | Carbon | Hydrogen | Nitrogen |
|---|---|---|---|
| Found (percent) | 57.31 | 5.17 | 5.42 |
| Theory (percent) | 57.35 | 5.21 | 5.57 |

EXAMPLE 8

*2-Naphthyl Dimethylsulfamate*

28.7 grams (0.200 mole) of dimethylsulfamoyl chloride was added with stirring to a solution of 28.8 grams (0.200 mole) of 2-naphthol in 400 milliliters of 5 percent aqueous sodium hydroxide solution. The resulting mixture was stirred at room temperature for 24 hours to obtain a 2-naphthyl dimethylsulfamate product as a white solid precipitate. The latter was recovered by filtration, and excess dimethylsulfamoyl chloride added to the filtrate and the resulting mixture stirred vigorously at room temperature for 1 hour to obtain additional precipitate of 2-naphthyl dimethylsulfamate product. The latter was recovered by filtration and the combined products recrystallized from ethanol to obtain a purified 2-naphthyl dimethylsulfamate product as white platelets melting at 72°–73° C. The product had elemental analyses as follows:

|  | Carbon | Hydrogen | Nitrogen |
|---|---|---|---|
| Found (percent) | 57.31 | 5.08 | 5.56 |
| Theory (percent) | 57.35 | 5.21 | 5.57 |

EXAMPLE 9

*4,4'-Biphenylyl Bis(Dimethylsulfamate)*

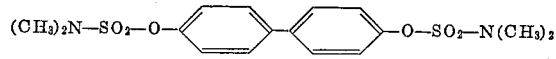

28.7 grams (0.200 mole) of dimethylsulfamoyl chloride was added to a well stirred solution of 18.6 grams (0.100 mole) of 4,4'-dihydroxybiphenyl in 250 milliliters of 5 percent aqueous sodium hydroxide solution. The mixture was stirred vigorously at room temperature for 20 minutes whereupon a reaction took place with the formation of a 4,4'-biphenylyl bis(dimethylsulfamate) product which precipitated in the reaction mixture. The latter was recovered by filtration and purified by treating with decolorizing charcoal in boiling glacial acetic acid and twice recrystallized from glacial acetic acid to obtain a purified 4,4'-biphenylyl bis(dimethylsulfamate) product as white needles melting at 191°–192° C. The product had elemental analyses as follows:

|  | Carbon | Hydrogen | Nitrogen |
|---|---|---|---|
| Found (percent) | 48.02 | 4.94 | 7.02 |
| Theory (percent) | 48.00 | 5.04 | 7.00 |

EXAMPLE 10

*2-Methyl-4-Isopropylphenyl Diethylsulfamate*

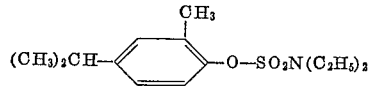

17 grams (0.1 mole) of diethylsulfamoyl chloride is added with vigorous stirring to a solution of 15 grams (0.1 mole) of 2-methyl-4-isopropylphenol in 24 grams (0.6 mole) of sodium hydroxide and 185 milliliters of water. The reaction mixture is stirred with cooling for about 1 hour to obtain a 2-methyl-4-isopropylphenyl diethylsulfamate product having a molecular weight of 285.

EXAMPLE 11

*2-Nitro-4-Tertiary-Butylphenyl Diethylsulfamate*

17 grams (0.1 mole) of diethylsulfamoyl chloride is added to a stirred solution of 20 grams (0.1 mole) of 2-nitro-4-tertiary-butylphenol in 50 milliliters of pyridine at 50° C. The reaction mixture is stirred for about 4 hours with continued heating and then allowed to cool to room temperature. The mixture is then poured into ice-concentrated hydrochloric acid mixture to precipitate the desired 2-nitro-4-tertiary - butylphenyl diethylsulfamate product as a solid having a molecular weight of 330.

EXAMPLE 12

*4-Diethylaminophenyl Di-Normal-Butylsulfamate*

23 grams (0.1 mole) of di-normal-butylsulfamoyl chloride is added with stirring to an ice cold solution of 16 grams (0.1 mole) of 4-diethylaminophenol in 100 milliliters of 10 percent aqueous sodium hydroxide solution. The mixture is stirred vigorously while cooling in the ice bath for about 5 hours to obtain the desired 4-diethylaminophenyl di-normal-butylsulfamate product having a molecular weight of 356.

EXAMPLE 13

*4,4'-Biphenylyl Bis(Di-Normal-Propylsulfamate)*

40 grams (0.2 mole) of di-normal-propylsulfamoyl chloride is added with stirring to a solution of 19 grams (0.1 mole) of 4,4'-dihydroxybiphenyl in 250 milliliters of 5 percent aqueous sodium hydroxide solution. The mixture is stirred vigorously at room tempreature for about 30 minutes to precipitate a white solid product. The latter is recovered by filtration and purified to obtain the desired 4,4'-biphenylyl bis(di-normal - propylsulfamate) product having a molecular weight of 512.

EXAMPLE 14

In reactions carried out in a similar manner, the following sulfamates are prepared:

Phenyl di-normal-propylsulfamate by the reaction of phenol and di-normal-propylsulfamoyl chloride.

4-diethylamino-o-tolyl di-normal-propylsulfamate by the reaction of 4-diethylamino-o-cresol and di-normal-propylsulfamoyl chloride.

4-dimethylaminophenyl di-normal-propylsulfamate by the reaction of 4-dimethylaminophenol and di-normal-propylsulfamoyl chloride.

2-nitro-p-tolyl di-normal-butylsulfamate by the reaction of 2-nitro-p-cresol and di-normal-butylsulfamoyl chloride.

4-nitro-2,6-xylyl di-normal-butylsulfamate by the reaction of 4-nitro-2,6-xylenol and di-normal-butylsulfamoyl chloride.

2-nitro-4-tertiary-butylphenyl di-normal-butylsulfamate by the reaction of 2-nitro-4-tertiary-butylphenol and di-normal-butylsulfamoyl chloride.

The products of the present invention are useful in various agricultural, household and commercial applications, particularly as herbicides and fungicides.

As herbicides, they are useful for the control of both aquatic and terrestrial weeds and undesirable plant species. The compounds which have a nitrogen-containing radical on the phenyl ring are especially useful as aquatic herbicides whereas compounds containing no nitrogen-containing radical on the phenyl ring are useful as terrestrial herbicides especially for the control of tampala and crabgrass. In a representative operation as aquatic herbicide, good controls of undesirable species such as Anacharis sp., *Lysimastrum nummularia*, *Salvinia rotundifolia* and Ceratophyllum sp. were obtained when, in separate operations, these undesirable plant species were exposed to aqueous dispersions containing as little as 10 parts per million of p-nitrophenyl dimethylsulfamate and 3,5-dimethyl-4-dimethylaminophenyl dimethylsulfamate.

As fungicides, the compounds are particularly useful for the control of species of fungi which are the causative organisms of plants diseases known as late blight, wheat leaf rust and cucumber powdery mildew.

I claim:

1. An aryl dialkylsulfamate having the structure $$Ar(OSO_2NR_2)_n$$

wherein Ar is selected from the group consisting of biphenylene, di-lower-alkylaminophenyl and di-lower-alkylamino(lower alkyl)phenyl; R is a lower alkyl radical containing from 1 to 4 carbon atoms, inclusive; wherein when Ar is selected from the group consisting of di-lower-alkylaminophenyl and di-lower-alkylamino(lower alkyl)phenyl, $n$ is an integer of 1, and when Ar is biphenylene, $n$ is an integer of 2; and wherein the di-lower-alkylamino(lower alkyl)phenyl radical is a phenyl radical which is substituted with both di-lower-alkylamino and lower alkyl substituents.

2. 3,5-dimethyl - 4 - dimethylaminophenyl dimethylsulfamate.

3. 4,4'-biphenyl bis(dimethylsulfamate).

References Cited in the file of this patent

UNITED STATES PATENTS

| | | |
|---|---|---|
| 2,801,231 | Caldwell | July 30, 1957 |
| 2,839,562 | Wegler et al. | June 17, 1958 |